(12) United States Patent
Truelove et al.

(10) Patent No.: US 10,776,281 B2
(45) Date of Patent: Sep. 15, 2020

(54) SNOOP INVALIDATE FILTER FOR DISTRIBUTED MEMORY MANAGEMENT UNIT TO REDUCE SNOOP INVALIDATE LATENCY

(71) Applicant: INTERNATIONAL BUSINESS MACHINES CORPORATION, Armonk, NY (US)

(72) Inventors: Jake Truelove, Austin, TX (US); Ronald Kalla, Round Rock, TX (US); Jody Joyner, Austin, TX (US); Benjamin Herrenschmidt, Lyneham (AU); David A. Larson Stanton, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 63 days.

(21) Appl. No.: 16/152,241

(22) Filed: Oct. 4, 2018

(65) Prior Publication Data
US 2020/0110710 A1 Apr. 9, 2020

(51) Int. Cl.
  *G06F 12/10* (2016.01)
  *G06F 12/1045* (2016.01)
  *G06F 9/455* (2018.01)

(52) U.S. Cl.
  CPC ...... *G06F 12/1063* (2013.01); *G06F 9/45558* (2013.01); *G06F 2009/45583* (2013.01); *G06F 2212/65* (2013.01); *G06F 2212/68* (2013.01)

(58) Field of Classification Search
  CPC ........... G06F 2212/65; G06F 2212/654; G06F 2212/68–684; G06F 12/10–109
  See application file for complete search history.

(56) References Cited

U.S. PATENT DOCUMENTS

| | | | |
|---|---|---|---|
| 5,680,566 A * | 10/1997 | Peng | G06F 12/1027 711/206 |
| 5,715,427 A | 2/1998 | Barrera et al. | |
| 5,850,534 A | 12/1998 | Kranich | |

(Continued)

OTHER PUBLICATIONS

Jesung Kim; Jongmin Lee; Soontae Kim; "TLB Index-Based Tagging for Reducing Data Cache and TLB Energy Consumption", IEEE Transactions on Computers, vol. 66, No. 7, Jul. 2017 (Year: 2017).*

(Continued)

*Primary Examiner* — Khoa D Doan
(74) *Attorney, Agent, or Firm* — Kunzler Bean & Adamson; Bruce R. Needham (57) ABSTRACT

An apparatus for bypassing an invalidate search of a lookaside buffer includes a filter circuit that directs an invalidate command to a LPID/PID filter of an MMU of a processor and searches for an identifier targeted by the invalidate command. The MMU is external to cores of the processor. The apparatus includes an LPID/PID miss circuit that bypasses searching the lookaside buffer for addresses targeted by the invalidate command and returns a notification that the invalidate command did not identify the identifier targeted by the invalidate command in response to the filter circuit determining that the identifier targeted by the invalidate command is not stored in the LPID/PID filter.

19 Claims, 6 Drawing Sheets

(56) References Cited

U.S. PATENT DOCUMENTS

| | | | | |
|---|---|---|---|---|
| 6,105,113 | A * | 8/2000 | Schimmel | G06F 12/1027 711/144 |
| 6,122,709 | A | 9/2000 | Wicki et al. | |
| 6,341,337 | B1 | 1/2002 | Pong | |
| 6,446,188 | B1 * | 9/2002 | Henderson | G06F 12/023 711/119 |
| 6,510,508 | B1 * | 1/2003 | Zuraski, Jr. | G06F 12/1027 711/135 |
| 6,625,714 | B1 * | 9/2003 | Lyon | G06F 12/1054 711/168 |
| 6,704,845 | B2 | 3/2004 | Anderson et al. | |
| 7,669,011 | B2 * | 2/2010 | Conway | G06F 12/0815 711/146 |
| 8,762,652 | B2 | 6/2014 | Moyer | |
| 9,304,936 | B2 * | 4/2016 | Ghai | G06F 9/3824 |
| 10,282,301 | B2 * | 5/2019 | Simionescu | G06F 12/0868 |
| 10,339,059 | B1 * | 7/2019 | Mattina | G06F 12/0822 |
| 10,459,866 | B1 * | 10/2019 | Fleming, Jr. | G06F 13/4027 |
| 2002/0099913 | A1 * | 7/2002 | Steely, Jr. | G06F 12/0897 711/122 |
| 2003/0195939 | A1 | 10/2003 | Edirisooriya et al. | |
| 2004/0230750 | A1 * | 11/2004 | Blake | G06F 9/5016 711/146 |
| 2005/0273575 | A1 * | 12/2005 | Mukherjee | G06F 12/1027 711/207 |
| 2006/0277348 | A1 * | 12/2006 | Wooten | G06F 12/1027 710/315 |
| 2007/0061547 | A1 * | 3/2007 | Jordan | G06F 12/1027 711/207 |
| 2007/0186036 | A1 * | 8/2007 | Bittner, Jr. | G11C 15/00 711/108 |
| 2008/0028152 | A1 * | 1/2008 | Du | G06F 9/3802 711/129 |
| 2008/0077922 | A1 * | 3/2008 | Doring | G06F 12/1491 718/100 |
| 2010/0106936 | A1 * | 4/2010 | Doi | G06F 12/1027 711/205 |
| 2011/0107057 | A1 * | 5/2011 | Petolino, Jr. | G06F 12/1027 711/207 |
| 2012/0069029 | A1 * | 3/2012 | Bourd | G06F 9/546 345/502 |
| 2013/0007406 | A1 * | 1/2013 | Sheaffer | G06F 12/126 711/207 |
| 2016/0062890 | A1 * | 3/2016 | Salisbury | G06F 12/0815 711/146 |
| 2016/0350219 | A1 * | 12/2016 | Tune | G06F 12/0817 |
| 2017/0322728 | A1 * | 11/2017 | Huang | G06F 3/061 |
| 2018/0314634 | A1 * | 11/2018 | Bao | H04L 29/06 |
| 2018/0365172 | A1 * | 12/2018 | Helms | G06F 12/0842 |
| 2019/0042450 | A1 * | 2/2019 | Walker | G06F 12/0888 |
| 2019/0042469 | A1 * | 2/2019 | Coe | G06F 12/1027 |
| 2019/0073304 | A1 * | 3/2019 | Jiang | G06F 12/0815 |
| 2019/0258588 | A1 * | 8/2019 | Brandt | G06F 12/0864 |
| 2019/0294551 | A1 * | 9/2019 | Abhishek Raja | G06F 12/0891 |

OTHER PUBLICATIONS

Becker, "The Power PC 601 Microprocessor", IEEE Micro 13.5, 1993, pp. 1-15.

* cited by examiner

FIG. 6

SNOOP INVALIDATE FILTER FOR DISTRIBUTED MEMORY MANAGEMENT UNIT TO REDUCE SNOOP INVALIDATE LATENCY

BACKGROUND

The subject matter disclosed herein relates to lookaside buffers and more particularly relates to bypassing traversing a lookaside buffer when an identifier targeted by an invalidate command is found in a filter.

A processor of a computing device often includes multiple cores and some computing devices are configured for a user to divide computing resources to create a virtual machine situated on a logical partition. A logical partition is often capable of running a separate instance of an operating system. The processor may include multiple memory management units ("MMUs") where one MMU may be external to the cores and may manage common memory. Virtual machines typically use virtual or effective addresses that are different than physical addresses.

A lookaside buffer, such as a translation lookaside buffer ("TLB") stores effective addresses paired with physical addresses and has a limited number of memory locations and is typically much smaller than an effective address range and/or a physical address range. Often a hash function is used to map an address from a large address space to a smaller address space of a lookaside buffer. Often the lookaside buffer includes multiple entry locations for a particular hash to handle multiple effective or physical addresses having an identical hash. Each effective address in the lookaside buffer is paired with a physical address. In addition, each address pair is linked to a particular process identifier ("PID") of a logical partition identifier ("LPID") so that an address pair is mapped to a PID of a LPID in the lookaside buffer.

When an invalidate command is issued for a particular address, the hash function may be used to locate and invalidate a particular effective address/physical address pair. However, when a PID invalidate command is issued to invalidate all addresses of a particular process (identified by PID) of a partition (identified by LPID), currently execution of the PID invalidate command requires accessing each location of the lookaside buffer in search of the addresses that are linked to the PID targeted by the PID invalidate command, which is a time-intensive process. Often, the processor slows processing of commands as a search based on the PID invalidate command walks through each memory location looking for addresses linked to a PID targeted by the PID invalidate command. An LPID invalidate command, which invalidates all addresses for a particular LPID has even greater performance demands than a PID invalidate command.

SUMMARY

An apparatus for bypassing an invalidate search of a lookaside buffer is disclosed. A computer-implemented method and system also perform the functions of the apparatus. According to an embodiment of the present invention, the apparatus includes a filter circuit that directs an invalidate command to a LPID/PID filter of an MMU of a processor and parses the LPID/PID filter for an identifier targeted by the invalidate command. The MMU is external to cores of the processor. The apparatus includes an LPID/PID miss circuit that bypasses searching the lookaside buffer for addresses targeted by the invalidate command and returns a notification that the invalidate command did not identify the identifier targeted by the invalidate command in response to the filter circuit determining that the identifier targeted by the invalidate command is not stored in the LPID/PID filter.

According to an embodiment, a computer-implemented method for bypassing an invalidate search of a lookaside buffer includes directing an invalidate command to a LPID/PID filter of an MMU of a processor and parsing the LPID/PID filter for an identifier targeted by the invalidate command, where the MMU is external to cores of the processor. The computer-implemented method includes bypassing searching the lookaside buffer for addresses targeted by the invalidate command and returning a notification that the invalidate command did not identify the identifier targeted by the invalidate command in response to determining that the identifier targeted by the invalidate command is not stored in the LPID/PID filter.

According to some embodiments, a system for bypassing an invalidate search of a lookaside buffer includes a processor with a plurality of cores and an MMU external to the cores. The MMU includes a lookaside buffer, an LPID/PID filter and a filter circuit that directs an invalidate command to the LPID/PID filter of the MMU and parses the LPID/PID filter for an identifier targeted by the invalidate command. The MMU includes an LPID/PID miss circuit that bypasses searching the lookaside buffer for addresses targeted by the invalidate command and returns a notification that the invalidate command did not identify the identifier targeted by the invalidate command in response to the filter circuit determining that the identifier targeted by the invalidate command is not stored in the LPID/PID filter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

Many of the functional units described in this specification have been labeled as circuits, in order to more particularly emphasize their implementation independence. For example, a circuit may be implemented as a hardware circuit comprising custom VLSI circuits or gate arrays, off-the-shelf semiconductors such as logic chips, transistors, or other discrete components. All or a portion of a circuit may also be implemented in programmable hardware devices such as field programmable gate arrays, programmable array logic, programmable logic devices or the like.

All or a portion of a circuit may also be implemented by a processor executing code. Program instructions executing on a processor implementing a portion of a circuit may, for instance, comprise one or more physical or logical blocks of computer instructions which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements. As used herein, a described embodiment in the claims and/or specification using the format of "one or more of A and B" is an "inclusive or" and means that an embodiment may include only A, may include only B or may include a combination of both A and B and the "inclusive or" may also be written in the specification as A and/or B. As used herein, a described embodiment using the format of "one of A and B" is an "exclusive or" and means that the embodiment includes only A or only B but does not require both A and B. As used herein, a claim or embodiment using the format "one of A and B" may be used for embodiments where A and B appear to be mutually exclusive, but the Applicant intends that claims with a "one of A and B" clause may be infringed by an embodiment of a competitor that includes only A, may be infringed by an embodiment of a competitor that includes only B, or may be infringed by an embodiment of a competitor that includes both A and B.

An apparatus for bypassing an invalidate search of a lookaside buffer includes a filter circuit that directs an invalidate command to a LPID/PID filter of an MMU of a processor and parses the LPID/PID filter for an identifier targeted by the invalidate command. The MMU is external to cores of the processor. The apparatus includes an LPID/PID miss circuit that bypasses searching the lookaside buffer for addresses targeted by the invalidate command and returns a notification that the invalidate command did not identify the identifier targeted by the invalidate command in response to the filter circuit determining that the identifier targeted by the invalidate command is not stored in the LPID/PID filter.

In some embodiments, the invalidate command is either a PID invalidate command or an LPID invalidate command. The PID invalidate command seeks to invalidate addresses of a process for a particular logical partition potentially residing in the lookaside buffer and the identifier targeted by the PID invalidate command is a PID of a LPID. The LPID invalidate command seeks to invalidate addresses of a particular logical partition potentially residing in the lookaside buffer and the identifier targeted by the LPID invalidate command is a LPID. In other embodiments, the invalidate command is a TLBIE command or an SLBIE command. In other embodiments, the lookaside buffer is a translation lookaside buffer ("TLB") or a segment lookaside buffer ("SLB").

In some embodiments, the LPID/PID filter includes a plurality of LPID locations where each is configured to store a LPID and each LPID location includes one or more linked PID locations each configured to store a PID. In some embodiments, the apparatus includes an LPID/PID hit circuit that traverses a lookaside buffer to invalidate addresses targeted by the invalidate command in response to the filter circuit determining that the LPID/PID filter is storing the identifier targeted by the invalidate command. In other embodiments, the LPID/PID filter includes a PID overflow bit for each LPID location and an LPID overflow bit for the LPID/PID filter and the apparatus includes an overflow circuit that sets the PID overflow bit of a LPID targeted by a PID invalidate command in response to the filter circuit determining that each PID location linked to the LPID has a stored PID and determining that the PID invalidate command is targeting a PID of the LPID different than the stored PIDs linked to the LPID.

In the embodiment, the overflow circuit traverses the lookaside buffer to invalidate addresses in the lookaside buffer linked to the PID of the LPID targeted by the PID invalidate command in response to determining that the PID overflow bit of the LPID targeted by the PID invalidate command is set. In other embodiments, the overflow circuit sets the LPID overflow bit of the LPID/PID filter in response to determining that each LPID location of the LPID/PID filter has a stored LPID and determining that an LPID invalidate command is targeting a LPID different than the stored LPIDs. In the embodiment, the overflow circuit traverses the lookaside buffer to invalidate addresses in the lookaside buffer linked to the LPID targeted by the LPID invalidate command in response to determining that the LPID overflow bit is set for the LPID/PID filter.

In a further embodiment, the LPID/PID hit circuit traverses the lookaside buffer to invalidate addresses in a lookaside buffer targeted by a subsequent PID invalidate command of a LPID targeted by the PID invalidate command in response to the PID overflow bit being set for the LPID and the LPID/PID hit circuit traverses the lookaside buffer to invalidate addresses in a lookaside buffer targeted by subsequent LPID invalidate commands in response to the LPID overflow bit being set. In some embodiments, the apparatus includes a filter entry invalidate circuit that invalidates a PID of a LPID stored in the LPID/PID filter in response to the LPID/PID hit circuit invalidating addresses in the lookaside buffer for the PID of the LPID and a corresponding PID overflow bit not being set or invalidates a LPID and associated PIDs stored in the LPID/PID filter in response to the LPID/PID hit circuit invalidating addresses in the lookaside buffer for the LPID and an LPID overflow bit not being set.

In other embodiments, the apparatus includes a filter entry circuit that, in response to the lookaside buffer storing an address and associated PID and LPID, stores the PID in an empty PID location of the LPID in response to the LPID existing in the LPID/PID filter and in response to the LPID location having an available PID location and/or stores the LPID in an empty LPID location and stores the PID in a PID location associated with the LPID in response to the LPID not existing in the LPID/PID filter. In other embodiments, the apparatus includes a PID clear circuit that invalidates PIDs of a LPID stored in the LPID/PID filter in response to a PID clear command targeting the LPID. In other embodiments, the apparatus includes a filter clear circuit that invalidates the LPIDs and associated PIDs stored in the LPID/PID filter in response to an LPID clear command. In other embodiments, the invalidate command is a global invalidate command sent to two or more MMUs of the processor. In other embodiments, each address stored in the lookaside buffer includes an effective address paired with a physical address.

According to an embodiment, a computer-implemented method for bypassing an invalidate search of a lookaside buffer includes directing an invalidate command to a LPID/PID filter of an MMU of a processor and parsing the LPID/PID filter for an identifier targeted by the invalidate command, where the MMU is external to cores of the processor. The computer-implemented method includes traversing a lookaside buffer to invalidate addresses targeted by the invalidate command in response to determining that the LPID/PID filter is storing the identifier targeted by the invalidate command and bypassing searching the lookaside buffer for addresses targeted by the invalidate command and returning a notification that the invalidate command did not identify the identifier targeted by the invalidate command in response to determining that the identifier targeted by the invalidate command is not stored in the LPID/PID filter.

In some embodiments, the LPID/PID filter includes a PID overflow bit for each LPID location and a LPID overflow bit for the LPID/PID filter and the computer-implemented method includes setting the PID overflow bit of a LPID in response to determining that each PID location linked to the LPID has a stored PID and determining that the invalidate command is targeting a PID of the LPID different than the stored PIDs linked to the LPID. In the embodiments, the computer-implemented method includes traversing the lookaside buffer to invalidate addresses in the lookaside buffer linked to the PID of the LPID targeted by the invalidate command in response to determining that the PID overflow bit of the LPID targeted by the PID invalidate command is set. In the embodiments, the computer-implemented method includes setting the LPID overflow bit of the LPID/PID filter in response to determining that each LPID location of the LPID/PID filter has a stored LPID and determining that the invalidate command is targeting a LPID different than the stored LPIDs, where the computer-implemented method includes traversing the lookaside buffer to invalidate addresses in the lookaside buffer linked to the LPID targeted by the invalidate command in response to determining that the LPID overflow bit is set for the LPID/PID filter.

In some embodiments, the computer-implemented method includes traversing the lookaside buffer to invalidate addresses in the lookaside buffer of a process for a particular logical partition targeted by a subsequent PID invalidate command in response to the PID overflow bit being set for the LPID. In other embodiments, the computer-implemented method includes traversing the lookaside buffer to invalidate addresses in a lookaside buffer targeted by subsequent LPID invalidate commands in response to the LPID overflow bit being set. In other embodiments, in response to the lookaside buffer storing an address and associated PID and LPID, the computer-implemented method includes storing the PID in an empty PID location of the LPID in response to the LPID existing in the LPID/PID filter and in response to the LPID location having an available PID location, and the computer-implemented method includes storing the LPID in an empty LPID location and storing the PID in a PID location associated with the LPID in response to the LPID not existing in the LPID/PID filter.

In some embodiments, the computer-implemented method includes invalidating a PID of a LPID stored in the LPID/PID filter in response to invalidating addresses in the lookaside buffer for the PID of the LPID and a PID overflow bit not being set, and/or invalidating a LPID and associated PIDs stored in the LPID/PID filter in response to invalidating addresses in the lookaside buffer for the LPID and an LPID overflow bit not being set. In other embodiments, the computer-implemented method includes invalidating the PIDs of a LPID stored in the LPID/PID filter in response to a PID clear command targeting the LPID and the computer-implemented method includes invalidating the LPIDs and associated PIDs stored in the LPID/PID filter in response to an LPID clear command.

According to some embodiments, a system for bypassing an invalidate search of a lookaside buffer includes a processor with a plurality of cores and an MMU external to the cores. The MMU includes a lookaside buffer, an LPID/PID filter and a filter circuit that directs an invalidate command to the LPID/PID filter of the MMU and parses the LPID/PID filter for an identifier targeted by the invalidate command. The MMU includes an LPID/PID hit circuit that traverses the lookaside buffer to invalidate addresses targeted by the invalidate command in response to the filter circuit determining that the LPID/PID filter is storing the identifier targeted by the invalidate command, and an LPID/PID miss circuit that bypasses searching the lookaside buffer for addresses targeted by the invalidate command and returns a notification that the invalidate command did not identify the identifier targeted by the invalidate command in response to the filter circuit determining that the identifier targeted by the invalidate command is not stored in the LPID/PID filter.

Figure 1:
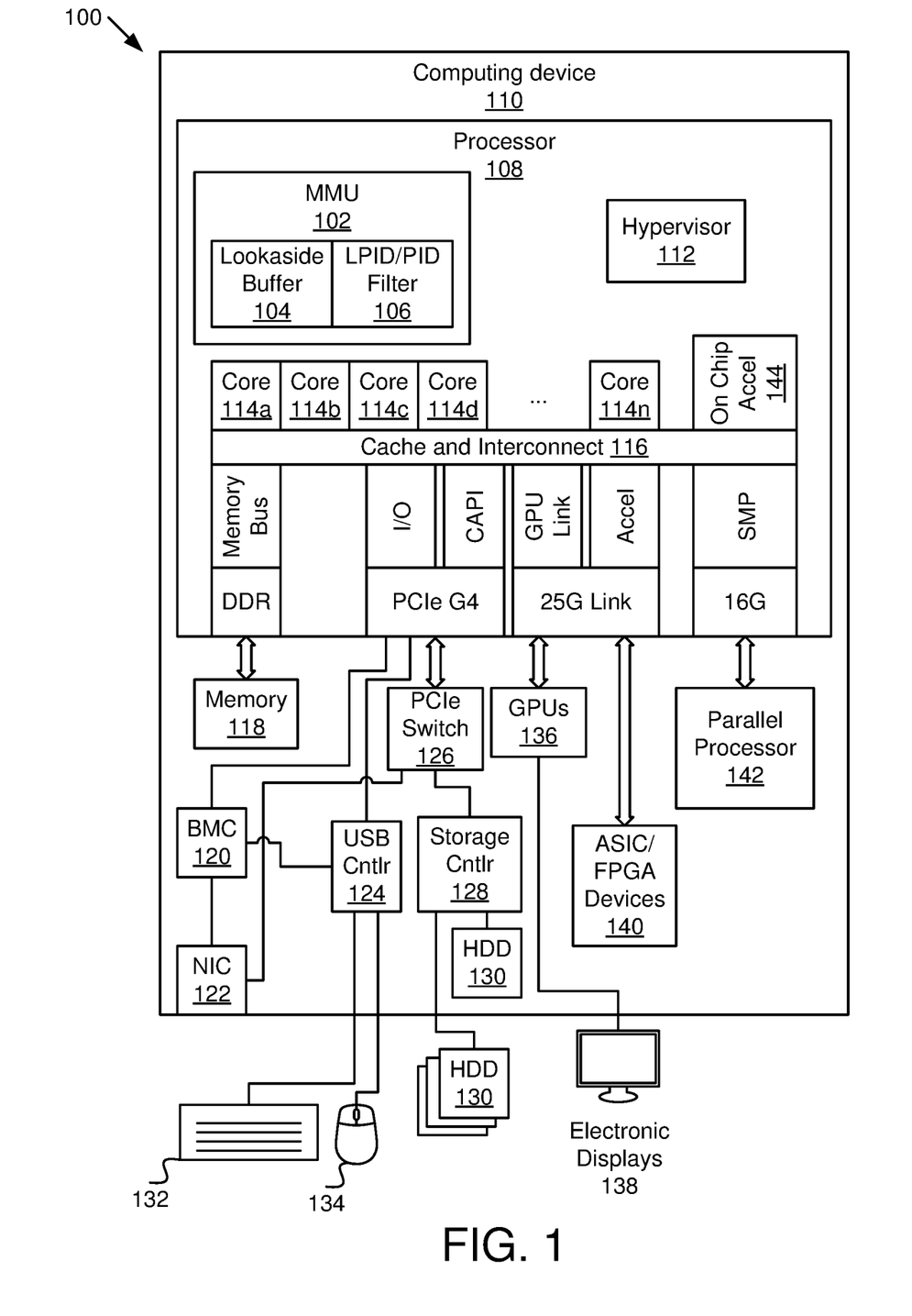
FIG. 1 is a schematic block diagram illustrating one embodiment of a system with an LPID/PID filter for bypassing an invalidate search of a lookaside buffer.

FIG. 1 is a schematic block diagram illustrating one embodiment of a system 100 with an LPID/PID filter 106 for bypassing an invalidate search of a lookaside buffer 104. The system 100 includes a memory management unit 102 in a processor 108 of a computing device 110 that, among other functions, translates logical (effective) addresses to physical addresses (which may be referred to as real addresses) for memory accesses, input/output ("I/O") accesses, and direct-store interface accesses. The MMU 102 is a distributed MMU that is shared across the system 100 and operates external to cores 114a-n (generically "114") of the processor 108. The processor 108, may be a Power9™ processor by IBM® or other processor with multiple cores 114. In some embodiments, the cores 114 include an MMU.

One embodiment of a Power9 processor 108 is depicted in the system 100 of FIG. 1, but the system 100 may also represent other processors with an MMU 102 where a global invalidate command is sent to invalidate addresses in a lookaside buffer 104 where the addresses share a common process identifier ("PID") or a common logical partition identifier ("LPID"). Often a global invalidate command is sent to the MMU 102 as well as to MMUs of the cores 114 and the MMU 102 and MMUs of the cores 114 respond. The global invalidate command (which may be referred to herein as an invalidate command, a PID invalidate command, or an LPID invalidate command) typically is not applicable to all MMUs. In some embodiments, the hypervisor 112 issues a global invalidate command.

The processor 108, in some embodiments, supports creation of virtual machines. A virtual machine is a grouping of resources of the processor 108 that appear to a user to be a computing device where the virtual machine uses only a portion of the computing device 110. A virtual machine may reside on a logical partition that encompasses a portion of the resources of the computing device, such as one or more cores 114, a portion of cache 116, access to one or more graphical processing units 136, peripheral component interconnect express ("PCIe") connected devices, a portion of memory 118, and the like. Typically, a logical partition runs an instance of an operating system. A typical logical partition often runs multiple processes. Each logical partition is typically given a LPID and each process within a LPID is given a PID. Typically, each PID belongs to a LPID.

A hypervisor 112 or virtual machine monitor ("VMM") includes computer software, firmware and/or hardware that creates and runs virtual machines. The hypervisor 112 may issue invalidate commands that invalidate one or more effective and/or physical addresses. The processor 108 with several cores 114 includes cache 116, which may be dedicated to a particular core (e.g. 114a) or shared among cores 114, and other interconnect circuits between cores 114 and various buses. The buses may include a memory bus to memory 118, which may be shared by the various cores 114. The buses may include I/O and Coherent Accelerator Processor Interface ("CAPI") buses to PCIe devices, such as to a PCIe switch 126 connected to a network interface card ("NIC") 122 for computer network connection, to a storage controller 128 connected to devices such as a hard disk drive 130 or other non-volatile storage, a universal serial bus ("USB") controller connected to devices such as a keyboard 132, a mouse 134, etc., and the like.

The I/O and/or CAPI buses may also connect to a baseboard management controller ("BMC") 120, which may control various devices, such as fans, and physical conditions of the computing device 110 and may communicate with other parallel processors 142, an external server (not shown), etc. The buses may include a GPU link and/or accelerator bus that are relatively high speed for connection to GPUs 136, which may connect to electronic displays 138, or to other ASIC/FPGA devices 140. A symmetric multi-processing ("SMP") bus may connect the processor 108 to one or more parallel processors 142. The processor 108 may also include one or more on-chip or on-board accelerators 144. One of skill in the art will recognize other architectures of a computing device 110 and/or processor 108 that includes an MMU 102 with one or more lookaside buffers 104.

The lookaside buffer 104 may be a translation lookaside buffer ("TLB") or a segment lookaside buffer ("SLB"). A TLB is commonly used to store an effective address (which may be called a logical address or virtual address) paired with a physical address (or real address). A TLB that is supplied with an effective address provides a corresponding physical address or vice versa in a process that is commonly referred to as a translation. A TLB is used for some operating systems. An SLB performs a similar function for other operating systems and a lookaside buffer 104, as used herein, refers to both a TLB and a SLB or other similar buffer.

A lookaside buffer 104 has a limited number of memory locations and is typically much smaller than an effective address range and/or a physical address range. Often a hash function is used to map an address from a large address space to a smaller address space of a lookaside buffer 104. In some embodiments, the lookaside buffer 104 includes multiple entry locations for a particular hash to handle multiple effective or physical addresses having an identical hash. Each effective address in the lookaside buffer 104 is paired with a physical address. In addition, each address pair is linked to a particular PID of a LPID so that an address pair is mapped to a PID of a LPID in the lookaside buffer 104.

When an invalidate command is issued for a particular address, the hash function may be used to invalidate a particular effective address/physical address pair. However, when a PID invalidate command is issued to invalidate all addresses of a particular PID of a LPID, currently the PID invalidate command must traverse or move through each location of the lookaside buffer 104 in search of the addresses that are linked to the PID targeted by the PID invalidate command, which is a time-intensive process. Often, the processor 108 slows processing of commands as execution of the PID invalidate command occurs and the process walks through each memory location of the lookaside buffer 104. Note that the term "invalidate command" may refer to a PID invalidate command, an LPID invalidate command or both. Examples of an invalidate command are a TLBIE command and a SLBIE command.

If the PID invalidate command finds addresses belonging to the PID of the LPID, the lookaside buffer 104 invalidates the addresses in the lookaside buffer 104 and the MMU 102 returns a notification that the PID invalidate command has completed. If the PID invalidate command searches the entire lookaside buffer 104 and does not find any addresses linked to the PID of the LPID targeted by the PID invalidate command, the MMU 102 returns a notification indicating that no addresses belonging to the PID targeted by the PID invalidate command were found. One embodiment of the notification is a not_my_lpar message. Thus, the PID invalidate command resulted in a lengthy process that did not end up invalidating any addresses in the lookaside buffer 104.

An LPID invalidate command similarly seeks to invalidate all addresses in the lookaside buffer 104 of a particular LPID, which may include several PIDs. The LPID invalidate command may result in invalidating addresses of the lookaside buffer 104, but may also result in invalidating no addresses stored in the lookaside buffer 104, which again is a waste of resources. The MMU 102 may also issue a notification indicating that one or more addresses were invalidated or may issue a notification indicating that no addresses were found related to the LPID targeted by the LPID invalidate command.

The system 100 includes an MMU 102 that has an LPID/PID filter 106 that functions with the lookaside buffer 104 to bypass traversing the lookaside buffer 104 for addresses of a process for a particular logical partition or to a logical partition targeted by a global invalidate command when the PID of the process or LPID of the logical partition targeted by the invalidate command are stored in the LPID/PID filter 106, which reduces processing time of an invalidate command targeting addresses of a process assigned a particular PID or a logical partition assigned a particular LPID that are not stored in the lookaside buffer 104. The function of the LPID/PID filter 106 are described in more detail with regards to the apparatuses 200, 300 of FIGS. 2 and 3.

Figure 2:
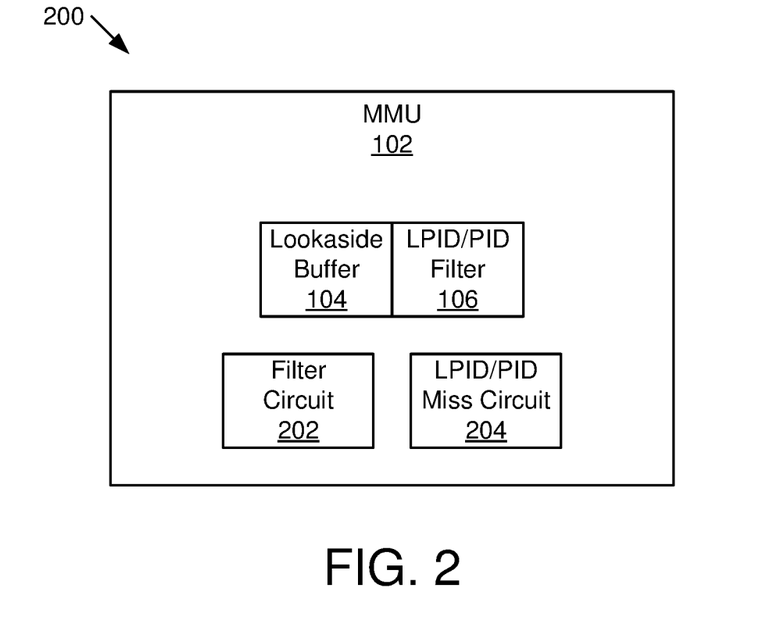
FIG. 2 is a schematic block diagram illustrating one embodiment of an apparatus with an LPID/PID filter for bypassing an invalidate search of a lookaside buffer.

FIG. 2 is a schematic block diagram illustrating one embodiment of an apparatus 200 with an LPID/PID filter 106 for bypassing an invalidate search of a lookaside buffer 104. The apparatus 200 includes one embodiment of the MMU 102 with the lookaside buffer 104 adjacent to the LPID/PID filter 106, a filter circuit 202 and an LPID/PID miss circuit 204, which are described below.

The apparatus 200 includes a filter circuit 202 that directs an invalidate command to the LPID/PID filter 106 of the MMU 102 of the processor 108 and parses the LPID/PID filter 106 for an identifier targeted by the invalidate command. The MMU 102 is external to cores 114 of the processor 108. For example, the invalidate command may be a PID invalidate command that includes a specific PID of a LPID. The filter circuit 202, in some embodiments, snoops a communication bus connected to the MMU 102 and intercepts the invalidate command prior to the lookaside buffer 104 executing a search of addresses in the lookaside buffer 104 that have the identified PID of the LPID targeted by the invalidate command.

In some embodiments, the filter circuit 202 is part of the LPID/PID filter 106. The LPID/PID filter 106, in some embodiments, is a latch structure or other memory structure capable of storing a certain number of LPIDs. In one example, the LPID/PID filter 106 includes 64 LPID slots or locations. (As used herein, a slot and a location in the LPID/PID filter 106 are used interchangeably and both refer to a memory location in the LPID/PID filter 106.) For each LPID, at least one PID is also stored. In some embodiments, for each LPID slot there is a single PID slot. In other embodiments, for each LPID slot there are more than one PID slots. In one example, there are four PID slots for every LPID slot in the LPID/PID filter 106. The filter circuit 202 parses through the latch structure of the LPID/PID filter 106 seeking a particular PID of a particular LPID targeted by a PID invalidate command or the filter circuit 202 parses the LPID/PID filter 106 to find a particular LPID targeted by a LPID command.

The apparatus 200 includes an LPID/PID miss circuit 204 that bypasses searching the lookaside buffer 104 for addresses targeted by the invalidate command and returns a notification that the invalidate command did not identify the identifier targeted by the invalidate command in response to the filter circuit 202 determining that the identifier targeted by the invalidate command is not stored in the LPID/PID filter 106. The LPID/PID miss circuit 204 is advantageous to prevent searching each address of the lookaside buffer 104 when the PID of a LPID or LPID targeted by the invalidate command is not in the LPID/PID filter 106, which saves execution time.

For example, the invalidate command may target PID12 of LPID3 and the filter circuit 202 may determine that the combination of PID12 paired with LPID3 is not stored in the LPID/PID filter 106 so the LPID/PID miss circuit 204 may then bypass searching each address of the lookaside buffer 104. In some embodiments, the LPID/PID miss circuit 204 bypasses searching the lookaside buffer 104 by not initiating a search of the lookaside buffer 104. In other embodiments, the LPID/PID miss circuit 204 bypasses searching the lookaside buffer 104 by bypassing search circuitry. In addition, when the LPID/PID miss circuit 204 bypasses searching the lookaside buffer 104, the LPID/PID miss circuit 204 returns a notification that the invalidate command did not identify the identifier targeted by the invalidate command, for instance, by returning a not_my_lpar message. The not_my_lpar message may be coupled to the invalidate command and/or may include the PID and/or LPID targeted by the invalidate command.

Figure 3:
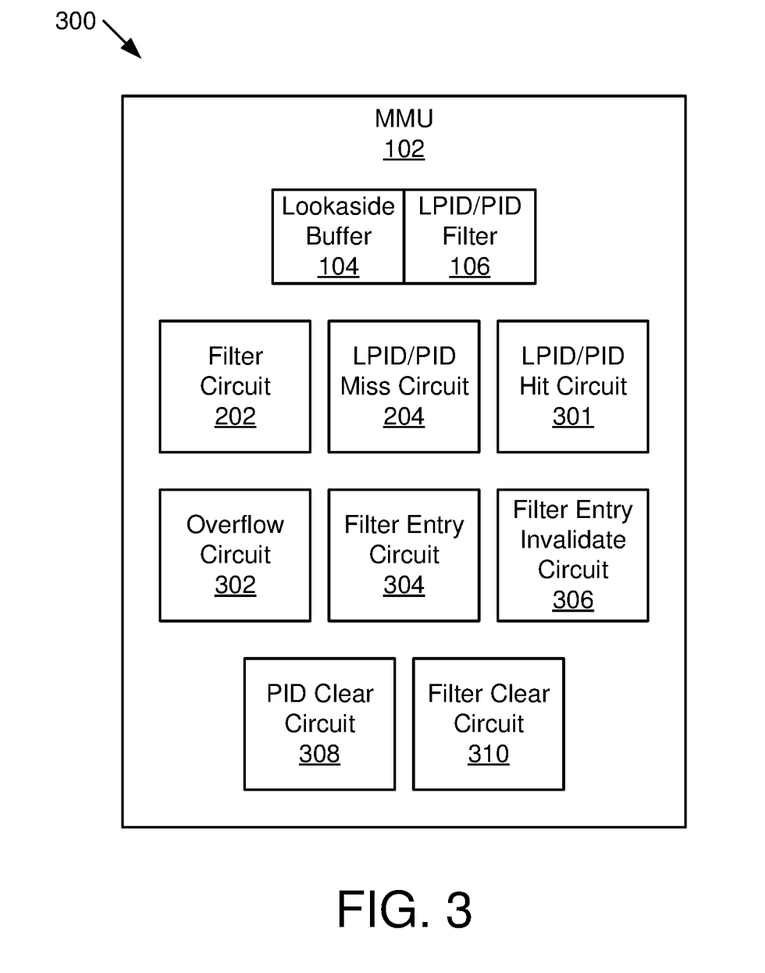
FIG. 3 is a schematic block diagram illustrating another embodiment of an apparatus with an LPID/PID filter for bypassing an invalidate search of a lookaside buffer.

FIG. 3 is a schematic block diagram illustrating another embodiment of an apparatus 300 with an LPID/PID filter 106 for bypassing an invalidate search of a lookaside buffer 104. The apparatus 300 includes an embodiment of the MMU 102 that includes the lookaside buffer 104, the LPID/PID filter 106, the filter circuit 202 and the LPID/PID miss circuit 204, which are substantially similar to those described above. The apparatus 300, in some embodiments, includes one or more of an LPID/PID hit circuit 301, an overflow circuit 302, a filter entry circuit 304, a filter entry invalidate circuit 306, a PID clear circuit 308 and a filter clear circuit 310, which are described below.

The apparatus 300 includes a LPID/PID hit circuit 301 that traverses the lookaside buffer 104 to invalidate addresses targeted by the invalidate command in response to the filter circuit 202 determining that the LPID/PID filter 106 is storing the identifier targeted by the invalidate command. For example, when the filter circuit 202 identifies the PID of a process of a logical partition targeted by the invalidate command, the LPID/PID hit circuit 301 traverses the lookaside buffer 104 by initiating a search of the lookaside buffer 104 by walking through each location in the lookaside buffer 104 looking for addresses paired with the PID and associated LPID targeted by the invalidate command, and invalidates the addresses as they are found.

For instance, if the invalidate command is a PID invalidate command targeting PID4 of LPID7 and the filter circuit 202 finds PID4 paired with LPID7 in the LPID/PID filter 106, the LPID/PID hit circuit 301 initiates a search of each address location in the lookaside buffer 104 linked to PID4 and LPID7. For example, effective address EA18 may be paired with physical address PA23 and linked to PID4 and LPID7. When the LPID/PID hit circuit 301 finds PID4 paired with LPID7, the LPID/PID hit circuit 301 invalidates the associated EA18 and PA23 as well as the linked PI4 and LPID7 from the lookaside buffer 104. In some embodiments, the LPID/PID hit circuit 301 searches the lookaside buffer 104 for targeted addresses. In another embodiment, the LPID/PID hit circuit 301 initiates a search by passing on PID4 and LPID7 to a circuit, such as a circuit in the MMU 102 or lookaside buffer 104, that searches and invalidates addresses in the lookaside buffer 104. In some embodiments, after the LPID/PID hit circuit 301 completes searching the lookaside buffer 104, the LPID/PID hit circuit returns a notification indicating that the invalidate command is completed or indicating that the identifier targeted by the invalidate command was not found in the lookaside buffer 104.

For the apparatus 300, in some embodiments, the LPID/PID filter 106 includes a PID overflow bit for each LPID location and an LPID overflow bit for the LPID/PID filter 106. The apparatus 300, in the embodiment, includes an overflow circuit 302 that sets the PID overflow bit of a LPID targeted by a PID invalidate command in response to the filter circuit 202 determining that each PID location linked to the LPID has a stored PID and determining that the PID invalidate command is targeting a PID of the LPID different than the stored PIDs linked to the LPID.

For example, the LPID/PID filter 106 may include two PID slots for each LPID slot. The LPID/PID filter 106 may include LPID6 in an LPID slot and PID5 and PID9 in the two PID slots linked to the LPID slot storing LPID6. An invalidate command may be a PID invalidate command targeting PID10 of LPID6. The filter circuit 202 determines that LPID6 is stored in the LPID/PID filter 106 and the overflow circuit 302 determines that the two slots linked to the LPID slot storing LPID6 are occupied by PID5 and PID9. The overflow circuit 302 also determines that the PID invalidate command is targeting PID10, which differs from PID5 and PID9 so the overflow circuit 302 sets a PID overflow bit associated with the LPID slot storing LPID6.

The overflow circuit 302, for a PID invalidate command, traverses the lookaside buffer 104 to invalidate addresses in the lookaside buffer of a process for a particular logical partition targeted by the PID invalidate command in response to determining that the PID overflow bit of the logical partition targeted by the invalidate command is set. For example, in response to the overflow bit being set for the LPID slot storing LPID6, the overflow circuit 302 initiates a full search of the lookaside buffer 104 to invalidate addresses linked to PID10 of LPID6.

In some embodiments, the overflow circuit 302 initiates the search within circuitry of the lookaside buffer 104 or initiates a search within circuitry of the LPID/PID hit circuit 301. In other embodiments, the overflow circuit 302 searches each location of the lookaside buffer 104 to invalidate addresses linked to PID10 of LPID6. Note that the LPID/PID hit circuit 301 initiates the full search of the lookaside buffer 104 for subsequent PID invalidate commands targeting a PID in LPID6.

In other embodiments, the overflow circuit 302 sets the LPID overflow bit of the LPID/PID filter 106 in response to determining that each LPID location of the LPID/PID filter 106 has a stored LPID and determining that an LPID invalidate command is targeting a LPID different than the stored LPIDs. For example, if the invalidate command is targeting LPID83 and the overflow circuit 302 determines that all LPID slots in the LPID/PID filter 106 are full, the overflow circuit 302 sets the LPID overflow bit of the LPID/PID filter 106.

The overflow circuit 302 traverses the lookaside buffer 104 to invalidate addresses in the lookaside buffer 104 linked to the LPID targeted by the invalidate command (e.g. LPID83) in response to determining that the LPID overflow bit is set for the LPID/PID filter 106. For each subsequent LPID invalidate command, the LPID/PID hit circuit 301 determines that the LPID overflow bit is set and traverses the lookaside buffer 104 to invalidate addresses linked to the logical partition targeted by the LPID invalidate command.

In some embodiments, for each subsequent PID invalidate command or LPID invalidate command, the LPID/PID hit circuit 301 determines that the LPID overflow bit is set and traverses the lookaside buffer 104 to invalidate addresses linked to the process of the logical partition targeted by the PID invalidate command.

The apparatus 300, in some embodiments, includes a filter entry circuit 304 that, in response to the lookaside buffer 104 storing an address and associated PID and LPID stores the PID in an empty PID location of the LPID in response to the LPID existing in the LPID/PID filter 106 and in response to the LPID location having an available PID location. For example, the LPID/PID filter 106 may have four PID slots per LPID slot and LPID7 may be stored in an LPID slot along with PID3 and PID5 so that two PID slots for LPID7 are empty. The lookaside buffer 104 or associated circuitry may store effective address EA240 and physical address PA121 in the lookaside buffer 104 along with LPID7 and PID12. The filter entry circuit 304 stores, in the LPID/PID filter 106, PID12 in one of the two empty slots for LPID7.

The lookaside buffer 104 may store an effective address and a physical address for various reasons. In one example, when an application executing on a logical partition stores data with an effective address, the MMU 102 assigns a corresponding physical address and the lookaside buffer 104 stores the effective address, physical address, PID of the process associated with the application, and LPID of the logical partition where the application is running. Another example is when an application accesses data, the lookaside buffer 104 may store the effective address, physical address, PID and LPID.

In other embodiments, the filter entry circuit 304, in response to the lookaside buffer 104 storing an address and associated PID and LPID, stores the LPID in an empty LPID location and stores the PID in a PID location associated with the LPID in response to the LPID not existing in the LPID/PID filter 106. For example, an application running on LPID27 and related to process PID18 may store data so the lookaside buffer 104 stores an effective address and a physical address linked to PID18 and LPID27. The filter entry circuit 304 or filter circuit 202 may determine that LPID27 has not been stored in the LPID/PID filter 106 so the filter entry circuit 304 stores LPID27 in an empty LPID slot in the LPID/PID filter 106 and stores PID18 in a PID slot linked to the LPID slot storing LPID 27. In some embodiments, the overflow circuit 302 determines if an overflow bit should be set when the filter entry circuit 304 attempts to store a PID and associated LPID.

The apparatus 300, in some embodiments, includes a filter entry invalidate circuit 306 that invalidates a PID of a LPID stored in the LPID/PID filter 106 in response to the LPID/PID hit circuit 301 invalidating addresses in the lookaside buffer 104 for the PID of the LPID and a corresponding PID overflow bit not being set. For example, for a PID invalidate command targeting PID7 of LPID29, the filter circuit 202 may determine that PID7 of LPID29 exists in the LPID/PID filter 106 and the LPID/PID hit circuit 301 traverses the lookaside buffer 104 and invalidates addresses linked to PID7 of LPID29 and the overflow circuit 302 has not set the PID overflow bit for LPID 29. The filter entry invalidate circuit 306 invalidates PID7 in a PID slot linked to the LPID slot storing LPID29, thus freeing up a PID slot for LPID29.

In other embodiments, the filter entry invalidate circuit 306 invalidates a LPID and associated PIDs stored in the LPID/PID filter 106 in response to the LPID/PID hit circuit 301 invalidating addresses in the lookaside buffer for the LPID and an LPID overflow bit not being set. For example, for an LPID invalidate command targeting LPID37 the filter circuit 202 may determine that LPID37 is stored in the LPID/PID filter 106 and the LPID/PID hit circuit 301 traverses the lookaside buffer 104 and invalidates addresses linked to LPID37 and the overflow circuit 302 has not set the LPID overflow bit for the LPID/PID filter 106. The filter entry invalidate circuit 306 invalidates LPID37 stored in the LPID/PID filter 106.

In some embodiments, the apparatus 300 includes a PID clear circuit 308 that invalidates PIDs of a LPID stored in the LPID/PID filter 106 in response to a PID clear command targeting the LPID of a logical partition. From time to time it is desirable to clear PIDs of an LPID stored in the LPID/PID filter 106. For example, the PID slots of an LPID may be filled for a long time and the appropriate PID overflow bit set and the apparatus 300 may traverse the lookaside buffer 104 to invalidate addresses for the various PIDs of the LPID multiple times, which is inefficient. The apparatus 300, hypervisor 112, etc. may direct the PID clear circuit 308 to invalidate the PIDs associated with the LPID to start over. In one example, a circuit in the apparatus 300 external to the hypervisor 112 directs the PID clear circuit 308 to invalidate the PIDs associated with the LPID to start over. The circuit in the apparatus 300 may detect that a PID overflow bit is set for a long time and may trigger the PID clear circuit 308.

In other embodiments, the apparatus 300 includes a filter clear circuit 310 that invalidates the LPIDs and associated PIDs stored in the LPID/PID filter 106 in response to an LPID clear command. For example, the LPID/PID filter 106 may have LPIDs stored in every LPID slot so that each invalidate command results in traversing the lookaside buffer 104 to invalidate addresses. The hypervisor 112 or other circuit may then issue an LPID clear command to start over. In an example, a circuit of the apparatus 300 tracks when the LPID overflow bit is set and may initiate the filter clear circuit 310 based on time, number of invalidate commands after setting the LPID overflow bit, etc.

Figure 4:
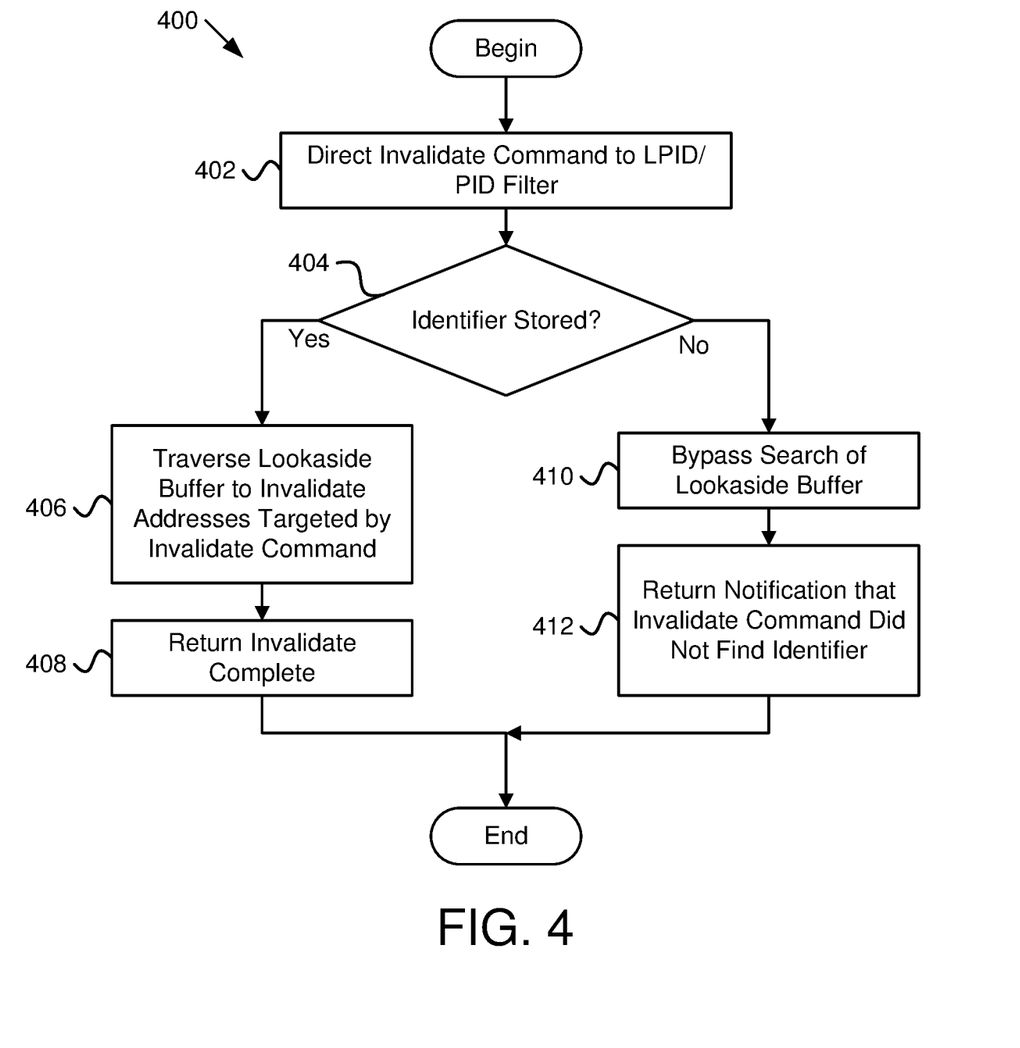
FIG. 4 is a schematic flow chart diagram illustrating one embodiment of a method for bypassing a search of a lookaside buffer in response to an invalidate command.

FIG. 4 is a schematic flow chart diagram illustrating one embodiment of a method 400 for bypassing a search of a lookaside buffer 104 in response to an invalidate command. The method 400 begins and directs 402 an invalidate command to a LPID/PID filter 106 of an MMU 102 of a processor 108 and parses the LPID/PID filter 106 to determine 404 if an identifier targeted by the invalidate command is stored in the LPID/PID filter 106. The MMU 102 is external to cores 1104 of the processor 108. If the method 400 determines 404 that an identifier targeted by the invalidate command is stored in the LPID/PID filter 106, the method 400 traverses 406 the lookaside buffer 104 to invalidate addresses of the process of the logical partition or of the logical partition targeted by the invalidate command and returns 408 an invalidate complete command, and the method 400 ends. If the method 400 determines 404 that an identifier targeted by the invalidate command is not stored in the LPID/PID filter 106, the method 400 bypasses 410 searching the lookaside buffer 104 for addresses of the PID/LPID or LPID targeted by the invalidate command and returns 412 a notification that the invalidate command did not find the PID/LPID or LPID identifier targeted by the invalidate command, and the method 400 ends. In various embodiments, the filter circuit 202, the LPID/PID hit circuit 301 and/or the LPID/PID miss circuit 204 carry out the steps of the method 400.

Figure 5:
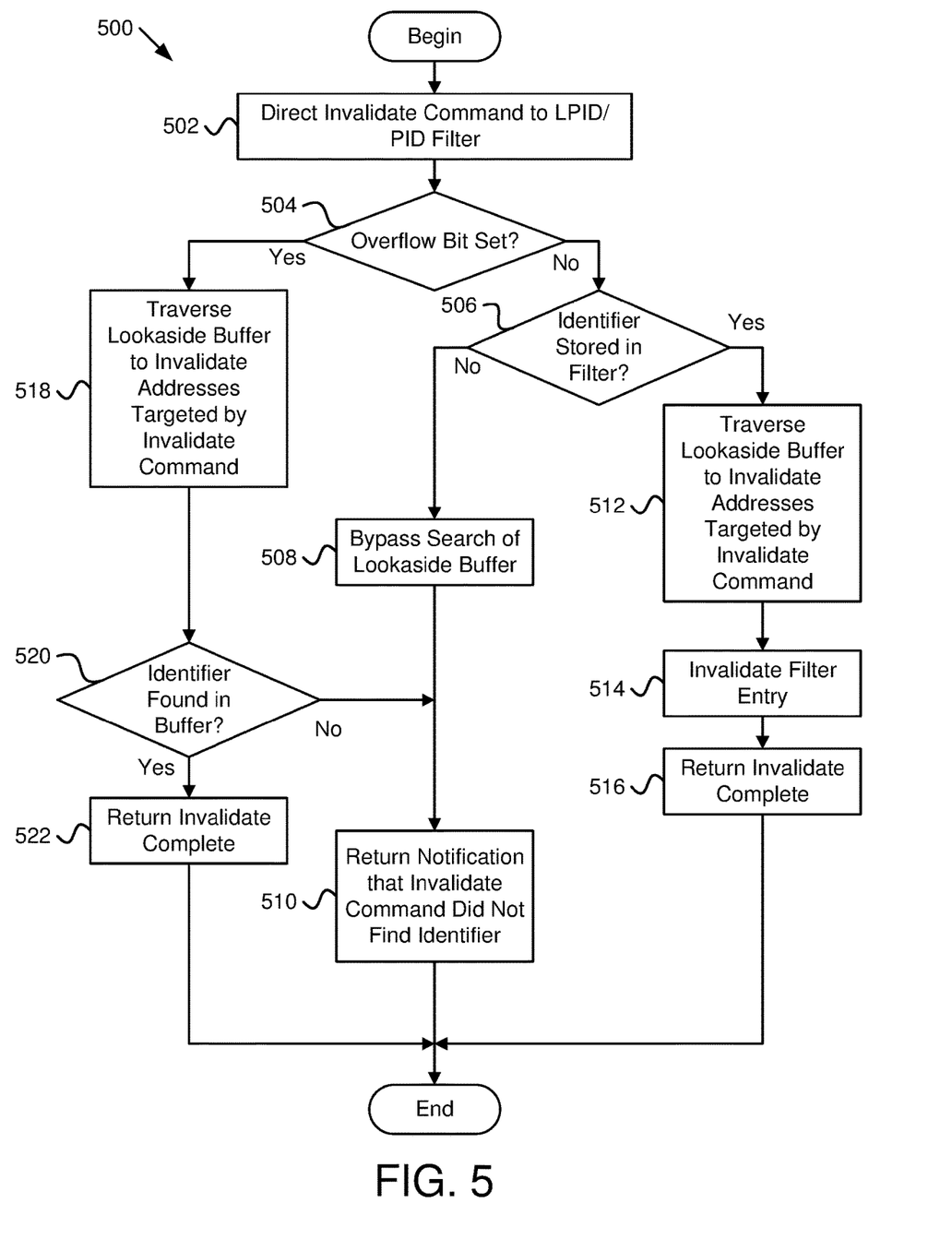
FIG. 5 is a schematic flow chart diagram illustrating another embodiment of a method for bypassing a search of a lookaside buffer in response to an invalidate command.

FIG. 5 is a schematic flow chart diagram illustrating another embodiment of a method 500 for bypassing a search of a lookaside buffer 104 in response to an invalidate command. The method 500 begins and directs 502 an invalidate command to a LPID/PID filter 106 of an MMU 102 of a processor 108 and parses the LPID/PID filter 106 to determine 404 if an identifier targeted by the invalidate command is stored in the LPID/PID filter 106. The method 500 determines 504 if an overflow bit is set where the overflow bit is associated with the identifier targeted by the invalidate command. For example, if the invalidate command is a PID invalidate command targeting a particular process of a logical partition, the method 500 determines 504 if the PID overflow bit of the logical partition targeted by the invalidate command is set. In another example, if the invalidate command is an LPID invalidate command, the method 500 determines 504 if the LPID overflow bit for the LPID/PID filter 106 is set.

If the method 500 determines 504 that an overflow bit is not set that is related to the identifier targeted by the invalidate command, the method 500 determines 506 if the identifier targeted by the invalidate command is stored in the LPID/PID filter 106. If the method 500 determines 506 that the identifier targeted by the invalidate command is not stored in the LPID/PID filter 106, the method 500 bypasses 508 searching the lookaside buffer 104 for addresses linked to the identifier targeted by the invalidate command and returns 510 a notification that the invalidate command did not find the identifier targeted by the invalidate command, and the method 500 ends.

If the method 500 determines 506 that the identifier targeted by the invalidate command is stored in the LPID/PID filter 106, the method 500 traverses 512 the lookaside buffer 104 to invalidate addresses of the identifier targeted by the invalidate command and invalidates 514 the LPID/PID filter entry matching the identifier targeted by the invalidate command. An assumption here is that if the PID of an LPID or LPID targeted by the invalidate command is stored in the LPID/PID filter 106, the lookaside buffer 104 includes addresses stored in the lookaside buffer relating to the PID of the LPID or LPID targeted by the invalidate command. In other embodiments, the method 500 determines if any addresses in the lookaside buffer 104 were invalidated and either returns a notification that invalidation is complete or that the identifier targeted by the invalidate command was not found. The method 500 returns 516 a notification that the invalidation is complete, and the method 500 ends.

If the method 500 determines 504 that an overflow bit that is related to the identifier targeted by the invalidate command is set, the method 500 traverses 518 the lookaside buffer 104 to invalidate addresses of the identifier targeted by the invalidate command. The method 500 determines 520 if the identifier targeted by the invalidate command and associated addresses are found in the lookaside buffer 104. If the method 500 determines 520 that the identifier targeted by the invalidate command and associated addresses are found in the lookaside buffer 104, the method returns 522 a notification that the invalidation is complete, and the method 500 ends. If the method 500 determines 520 that the identifier targeted by the invalidate command and associated addresses are not found in the lookaside buffer 104, the method returns 510 a notification that the invalidate command did not find the identifier targeted by the invalidate command, and the method 500 ends. In various embodiments, the filter circuit 202, the LPID/PID hit circuit 301, the LPID/PID miss circuit 204, the overflow circuit 302 and/or the filter entry invalidate circuit 306 carry out the steps of the method 500.

Figure 6:
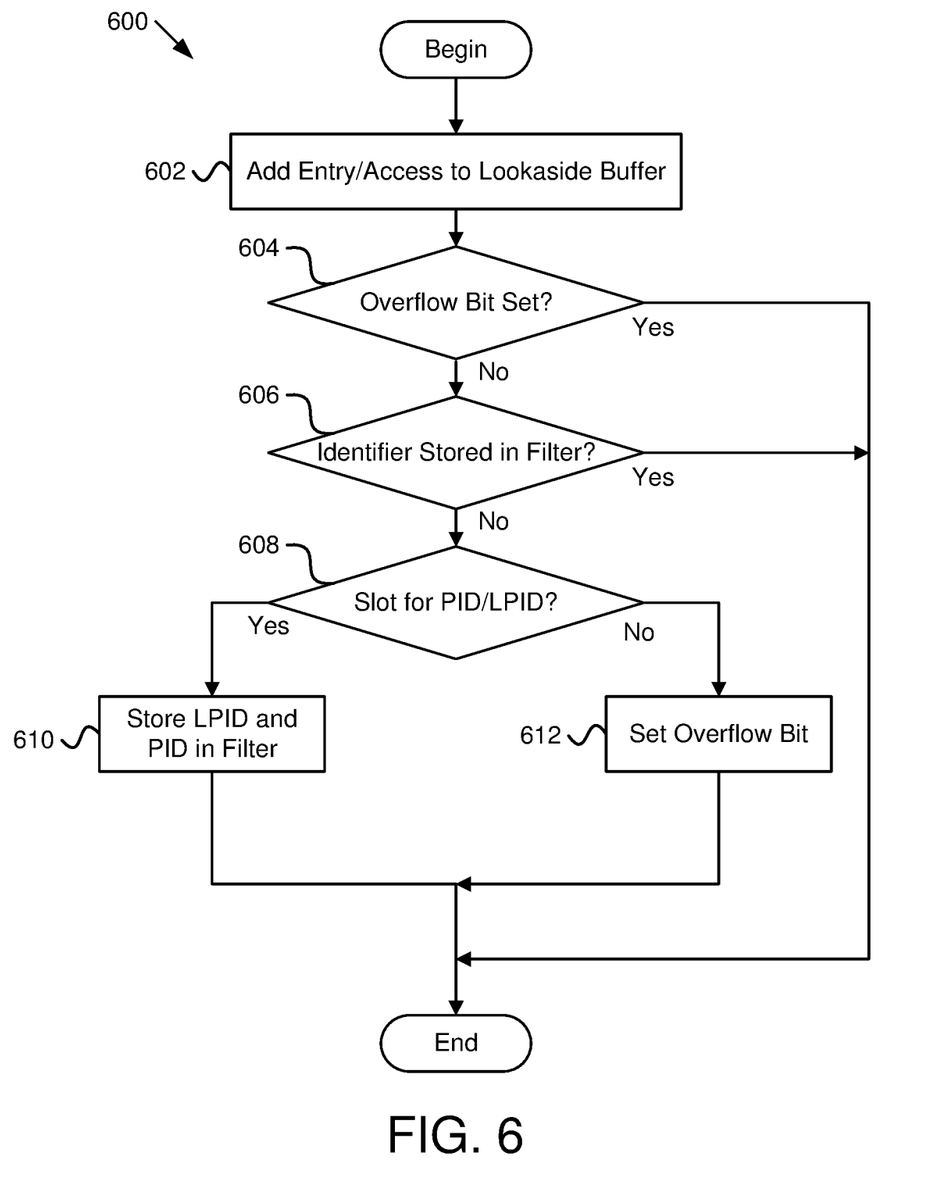
FIG. 6 is a schematic flow chart diagram illustrating one embodiment of a method for populating an LPID/PID filter used to bypass a search of a lookaside buffer in response to an invalidate command.

FIG. 6 is a schematic flow chart diagram illustrating one embodiment of a method 500 for populating an LPID/PID filter 106 used to bypass a search of a lookaside buffer 104 in response to an invalidate command. The method 600 begins and adds 602 addresses to a lookaside buffer 104 or accesses 602 an entry in the lookaside buffer 104. The addresses are linked to a particular PID of a process of a logical partition assigned an LPID. The method 600 determines 604 if a PID overflow bit is set in an LPID/PID filter 106 of the lookaside buffer 104 for a logical partition assigned to an LPID or if an LPID overflow bit is set for the LPID/PID filter 106. If the method 600 determines 604 that an applicable overflow bit is set, the method 600 ends.

If the method 600 determines 604 that a related overflow bit is not set, such as a PID overflow bit of the LPID or the LPID overflow bit for the LPID/PID filter 106, the method 600 determines 606 if the PID and related LPID identifier are stored in the LPID/PID filter 106. For example, the method 600 may find the LPID in an LPID slot and a PID in a PID slot linked to the LPID slot or the method 600 may not find the particular PID/LPID combination stored in the LPID/PID filter 106. If the method 600 determines 606 that the PID and related LPID identifier are stored in the LPID/PID filter 106, the method 600 ends. If the method 600 determines 606 if the PID and related LPID identifier are not stored in the LPID/PID filter 106, the method 600 determines 608 if there is an open PID slot for the LPID.

If the method 600 determines 608 that there is an open PID slot for the LPID, the method 600 stores 610 the PID in the open PID slot of the LPID or stores 610 both the LPID and PID in a new LPID/PID location. If the method 600 determines 608 that there is not an open PID slot for the LPID, the method 600 sets 612 an appropriate overflow bit, and the method 600 ends. For example, the method 600 may set a PID overflow bit for the LPID if the PID slots for the LPID are full or may set an LPID overflow bit if all LPID slots are full. In various embodiments, the overflow circuit 302 and filter entry circuit 304 may implement all or a part of the steps of the method 600.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
a filter circuit that directs an invalidate command to a logical partition identifier ("LPID")/process identifier ("PID") filter of a memory management unit ("MMU") of a processor and parses the LPID/PID filter for an identifier targeted by the invalidate command, the MMU external to cores of the processor; and
an LPID/PID miss circuit that bypasses searching a lookaside buffer for addresses targeted by the invalidate command and returns a notification that the invalidate command did not identify the identifier targeted by the invalidate command in response to the filter circuit determining that the identifier targeted by the invalidate command is not stored in the LPID/PID filter, wherein the invalidate command comprises one of a PID invalidate command and an LPID invalidate command, wherein the PID invalidate command seeks to invalidate addresses of a process for a particular logical partition potentially residing in the lookaside buffer and the identifier targeted by the PID invalidate command is a PID of a LPID and wherein the LPID invalidate command seeks to invalidate addresses of a logical partition potentially residing in the lookaside buffer and the identifier targeted by the LPID invalidate command is a LPID.

2. The apparatus of claim 1, wherein the invalidate command is a one of a translation lookaside buffer invalidate entry ("TLBIE") command and a segment lookaside buffer invalidate entry ("SLBIE") command.

3. The apparatus of claim 1, wherein the lookaside buffer comprises one of a translation lookaside buffer ("TLB") and a segment lookaside buffer ("SLB").

4. The apparatus of claim 1, wherein the LPID/PID filter comprises a plurality of LPID locations each configured to store a LPID and each LPID location comprises one or more linked PID locations each configured to store a PID.

5. The apparatus of claim 1, further comprising an LPID/PID hit circuit that traverses a lookaside buffer to invalidate addresses targeted by the invalidate command in response to the filter circuit determining that the LPID/PID filter is storing the identifier targeted by the invalidate command.

6. The apparatus of claim 5, wherein the LPID/PID filter further comprises a PID overflow bit for each LPID location and an LPID overflow bit for the LPID/PID filter and further comprising an overflow circuit that:
sets the PID overflow bit of a LPID targeted by a PID invalidate command in response to the filter circuit determining that each PID location linked to the LPID has a stored PID and determining that the PID invalidate command is targeting a PID of the LPID different than the stored PIDs linked to the LPID, wherein the overflow circuit traverses the lookaside buffer to invalidate addresses in the lookaside buffer linked to the PID of the LPID targeted by the PID invalidate command in response to determining that the PID overflow bit of the LPID targeted by the PID invalidate command is set; and
sets the LPID overflow bit of the LPID/PID filter in response to determining that each LPID location of the LPID/PID filter has a stored LPID and determining that an LPID invalidate command is targeting a LPID different than the stored LPIDs, wherein the overflow circuit traverses the lookaside buffer to invalidate addresses in the lookaside buffer linked to the LPID targeted by the LPID invalidate command in response to determining that the LPID overflow bit is set for the LPID/PID filter.

7. The apparatus of claim 6, wherein the LPID/PID hit circuit traverses the lookaside buffer to invalidate addresses in a lookaside buffer targeted by a subsequent PID invalidate command of a LPID targeted by the PID invalidate command in response to the PID overflow bit being set for the LPID and the LPID/PID hit circuit traverses the lookaside buffer to invalidate addresses in a lookaside buffer targeted by subsequent LPID invalidate commands in response to the LPID overflow bit being set.

8. The apparatus of claim 5, further comprising a filter entry invalidate circuit that one of:
invalidates a PID of a LPID stored in the LPID/PID filter in response to the LPID/PID hit circuit invalidating addresses in the lookaside buffer for the PID of the LPID and a corresponding PID overflow bit not being set; and invalidates a LPID and associated PIDs stored in the LPID/PID filter in response to the LPID/PID hit circuit invalidating addresses in the lookaside buffer for the LPID and an LPID overflow bit not being set.

9. The apparatus of claim 1, further comprising a filter entry circuit that, in response to the lookaside buffer storing an address and associated PID and LPID, one or more of:
stores the PID in an empty PID location of the LPID in response to the LPID existing in the LPID/PID filter and in response to the LPID location having an available PID location; and
stores the LPID in an empty LPID location and stores the PID in a PID location associated with the LPID in response to the LPID not existing in the LPID/PID filter.

10. The apparatus of claim 1, further comprising a PID clear circuit that invalidates PIDs of a LPID stored in the LPID/PID filter in response to a PID clear command targeting the LPID.

11. The apparatus of claim 1, further comprising a filter clear circuit that invalidates the LPIDs and associated PIDs stored in the LPID/PID filter in response to an LPID clear command.

12. The apparatus of claim 1, wherein each address stored in the lookaside buffer comprises an effective address paired with a physical address.

13. A computer-implemented method comprising:
directing an invalidate command to a logical partition identifier ("LPID")/process identifier ("PID") filter of a memory management unit ("MMU") of a processor;
parsing the LPID/PID filter for an identifier targeted by the invalidate command, the MMU external to cores of the processor;
bypassing searching a lookaside buffer for addresses targeted by the invalidate command and returning a notification that the invalidate command did not identify the identifier targeted by the invalidate command in response to determining that the identifier targeted by the invalidate command is not stored in the LPID/PID filter,
wherein the invalidate command comprises one of a PID invalidate command and an LPID invalidate command, wherein the PID invalidate command seeks to invalidate addresses of a process for a particular logical partition potentially residing in the lookaside buffer and the identifier targeted by the PID invalidate command is a PID of a LPID and wherein the LPID invalidate command seeks to invalidate addresses of a logical partition potentially residing in the lookaside buffer and the identifier targeted by the LPID invalidate command is a LPID.

14. The computer-implemented method of claim 13, further comprising traversing a lookaside buffer to invalidate addresses targeted by the invalidate command in response to determining that the LPID/PID filter is storing the identifier targeted by the invalidate command.

15. The computer-implemented method of claim 14, wherein the LPID/PID filter further comprises a PID overflow bit for each LPID location and a LPID overflow bit for the LPID/PID filter and further comprising:
setting the PID overflow bit of a LPID in response to determining that each PID location linked to the LPID has a stored PID and determining that the invalidate command is targeting a PID of the LPID different than the stored PIDs linked to the LPID and further comprising traversing the lookaside buffer to invalidate addresses in the lookaside buffer linked to the PID of the LPID targeted by the invalidate command in response to determining that the PID overflow bit of the LPID targeted by the PID invalidate command is set; and
setting the LPID overflow bit of the LPID/PID filter in response to determining that each LPID location of the LPID/PID filter has a stored LPID and determining that the invalidate command is targeting a LPID different than the stored LPIDs and further comprising traversing the lookaside buffer to invalidate addresses in the lookaside buffer linked to the LPID targeted by the invalidate command in response to determining that the LPID overflow bit is set for the LPID/PID filter.

16. The computer-implemented method of claim 14, further comprising traversing the lookaside buffer to invalidate addresses in the lookaside buffer of a process for a particular logical partition targeted by a subsequent PID invalidate command in response to the PID overflow bit being set for the LPID, and further comprising traversing the lookaside buffer to invalidate addresses in a lookaside buffer targeted by subsequent LPID invalidate commands in response to the LPID overflow bit being set.

17. The computer-implemented method of claim 13, in response to the lookaside buffer storing an address and associated PID and LPID, further comprising:
storing the PID in an empty PID location of the LPID in response to the LPID existing in the LPID/PID filter and in response to the LPID location having an available PID location; and
storing the LPID in an empty LPID location and storing the PID in a PID location associated with the LPID in response to the LPID not existing in the LPID/PID filter.

18. The computer-implemented method of claim 13, further one of:
invalidating a PID of a LPID stored in the LPID/PID filter in response to invalidating addresses in the lookaside buffer for the PID of the LPID and a PID overflow bit not being set; and
invalidating a LPID and associated PIDs stored in the LPID/PID filter in response to invalidating addresses in the lookaside buffer for the LPID and an LPID overflow bit not being set.

19. A system comprising:
a processor comprising a plurality of cores; and
a memory management unit ("MMU") external to the cores, the MMU comprising:
a lookaside buffer;
a logical partition identifier ("LPID")/process identifier ("PID") filter;
a filter circuit that directs an invalidate command to the LPID/PID filter of the MMU and parses the LPID/PID filter for an identifier targeted by the invalidate command; and
an LPID/PID miss circuit that bypasses searching the lookaside buffer for addresses targeted by the invalidate command and returns a notification that the invalidate command did not identify the identifier targeted by the invalidate command in response to the filter circuit determining that the identifier targeted by the invalidate command is not stored in the LPID/PID filter,
wherein the invalidate command comprises one of a PID invalidate command and an LPID invalidate command, wherein the PID invalidate command seeks to invalidate addresses of a process for a particular logical partition potentially residing in the lookaside buffer and the identifier targeted by the PID invalidate command is a PID of a LPID and wherein the LPID invalidate command seeks to invalidate addresses of a logical partition potentially residing in the lookaside buffer and the identifier targeted by the LPID invalidate command is a LPID.

\* \* \* \* \*